Patented Nov. 17, 1931

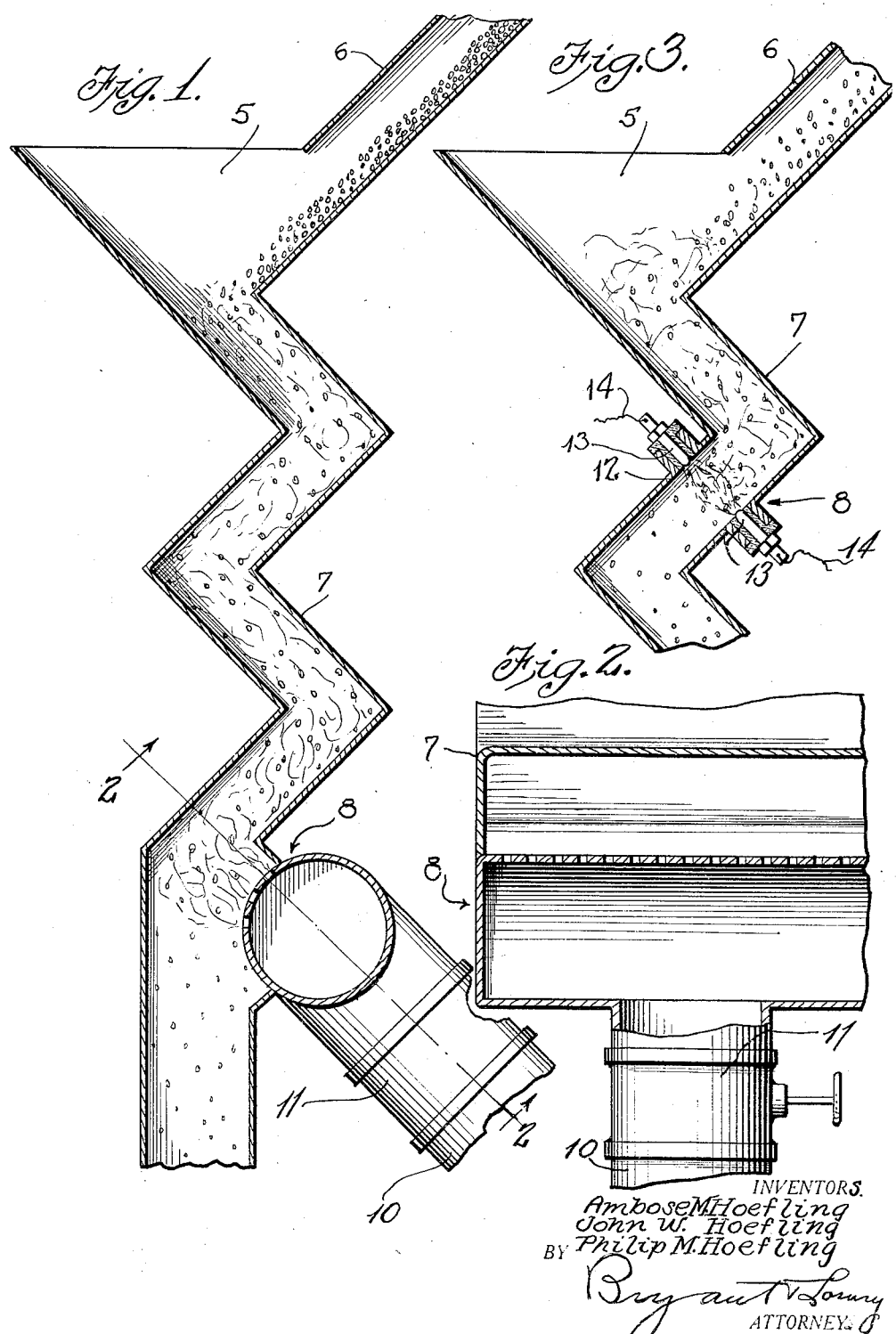

1,832,553

UNITED STATES PATENT OFFICE

AMBROSE M. HOEFLING, JOHN W. HOEFLING, AND PHILIP M. HOEFLING, OF CHICO, CALIFORNIA, ASSIGNORS TO HOEFLING BROS., INC., OF CHICO, CALIFORNIA, A CORPORATION OF CALIFORNIA

RICE CLEANING DEVICE

Application filed March 29, 1928. Serial No. 265,642.

This invention relates to rice cleaning processes, and has more particular reference to an improved process of and means for removing beards from rice and seed in preparing the same for milling or seeding purposes.

It is well known that water grass seed and rice occur together and that both have beards which interfere with cleaning the rice and separating the seed therefrom. The beards on the separated seed also greatly impair its value as feed and the like.

The primary object of the present invention is to provide an improved and novel process for removing beards from rice and seed, from bearded seed alone or from rice screenings by singeing the beards therefrom through the use of a mild or non-intense flame, thereby avoiding material scorching or burning of the rice.

A further object of this invention is to provide novel means whereby rice and seed may be subjected to a flame or the like of such mild intensity as to singe the beards therefrom without scorching or burning the rice and seed.

Other objects will appear as the nature of the invention is better understood, and the same consists in the novel process and means hereinafter more fully described, shown in the accompanying drawings and claimed.

In the drawings:—

Figure 1 is a fragmentary vertical sectional view of one form of means for carrying out the present process;

Figure 2 is a fragmentary section on line 2—2 of Figure 1; and

Figure 3 is a fragmentary vertical sectional view of another form of means for carrying out the present process.

In the drawings, 5 indicates a hopper to which rice and seed is fed through a spout or trough 6. A zigzag chute 7 of either circular or angular cross section leads from the hopper, and it may discharge into any appropriate receptacle, cleaner, bin or the like.

The chute 7 has a plurality of portions or leads angularly disposed and alternately inclined in opposite directions with relation to one another.

In order to produce a flame or flames in the zone of movement of the rice and seed while passing down the chute, a burner 8 is provided at a desired point in the chute.

In the form of the invention shown in Figures 1 and 2, the flame is produced by the use of a gas or liquid fuel burner having a fuel supply pipe 10 which leads from a suitable fuel source and is provided with a suitable control valve 11 for regulating the intensity of the flame.

In the form of the invention shown in Figure 3, an electrical arc burner forms the means for burning or scorching the beards. In this embodiment of the invention, the arc burner embodies electrodes conventionally shown at 12 and 13 and arranged so that the grain will pass through the space between the two electrodes of the burner where the flame or arc is suitably controlled and developed to such intensity as to accomplish the result sought. Since arc burners of this character are well known, it is thought unnecessary to supply a more detailed illustration or description thereof. The electrodes will, of course, be supplied with conductors, as at 14, for establishing a circuit with respect to said electrodes and a source of electricity.

The inclined portions or leads of the chute will retard the rice and seed in descending, so as to insure that they will move through the flame zone of the burner slowly enough to completely singe the beards therefrom, without materially scorching or burning the rice, when the burner is controlled to properly regulate the intensity of the flame.

The use of the baffles is of particular importance in the process of cleaning rice, as distinguished from processes for cleaning other seeds. Rice seeds are bearded, and in the descent of such seeds through a singeing apparatus the beards act like feathers on an arrow in flight, the main body of the seed tending to protect the beard itself from the action of the singeing flames. By the use of the baffles, the speed of the falling seeds are not only retarded so as to ensure the full action of the flame on the beards, but the seeds are thrown from side to side and their columns formed so modified as to bring all the seeds into intimate contact with the flame.

The process herein described, differs essentially from such processes as involve the direct vertical fall of seeds through a flame, or the conveyance of the seeds by means of endless carriers, which processes while adaptable to the cleaning of some varieties of seeds are inefficient for the purpose of cleaning rice or burning out the associated foul seeds and impurities.

While we have shown and described merely by way of example, certain forms of devices for carrying out the present process, it is nevertheless to be understood that the process may be carried out by many other different specific forms of means, and that the present invention is accordingly not limited to the specific means disclosed.

What we claim as new is:—

1. In a device for burning beards from grain, a hopper, a chute depending therefrom having a zigzag portion, and means for electrically producing a flame throughout the zigzag portion of the chute to an intensity which will burn the beards from said grain without material effect thereon.

2. In a device for burning beards from grain, a hopper, a chute depending therefrom having a zigzag portion and a burner for producing a flame throughout the zigzag portion of the chute to an intensity which will burn the beards from said grain without material effect thereon.

In testimony whereof we affix our signatures.

AMBOSE M. HOEFLING.
JOHN W. HOEFLING.
PHILIP M. HOEFLING.